United States Patent
Dimmick, III

(10) Patent No.: US 9,551,353 B2
(45) Date of Patent: Jan. 24, 2017

(54) COMPRESSOR BLADE MOUNTING ARRANGEMENT

(71) Applicant: General Electric Company, Schenectady, NY (US)

(72) Inventor: John Herbert Dimmick, III, Greenville, SC (US)

(73) Assignee: General Electric Company, Schenectady, NY (US)

( * ) Notice: Subject to any disclaimer, the term of this patent is extended or adjusted under 35 U.S.C. 154(b) by 704 days.

(21) Appl. No.: 13/963,425

(22) Filed: Aug. 9, 2013

(65) Prior Publication Data

US 2015/0040580 A1 Feb. 12, 2015

(51) Int. Cl.
| | | |
|---|---|---|
| F02C 3/04 | (2006.01) | |
| F02C 3/055 | (2006.01) | |
| F02C 3/06 | (2006.01) | |
| F04D 29/32 | (2006.01) | |
| F01D 5/30 | (2006.01) | |

(52) U.S. Cl.
CPC ............ *F04D 29/322* (2013.01); *F01D 5/303* (2013.01); *F01D 5/3038* (2013.01); *F01D 5/3046* (2013.01); *F02C 3/04* (2013.01); *F02C 3/055* (2013.01); *F02C 3/06* (2013.01)

(58) Field of Classification Search
CPC ...... F04D 29/322; F01D 5/303; F01D 5/3038; F01D 5/3046; F02C 3/04; F02C 3/055; F02C 3/06
USPC ............................................. 416/222, 219 R
See application file for complete search history.

(56) References Cited

U.S. PATENT DOCUMENTS

| | | | | |
|---|---|---|---|---|
| 2,157,827 A | * | 5/1939 | Kliemann | F01D 5/3046 416/217 |
| 2,722,802 A | * | 11/1955 | Blackwell | F02C 7/36 60/39.83 |
| 2,912,222 A | * | 11/1959 | Wilkes, Jr. | F01D 5/3038 29/889.21 |
| 3,597,109 A | | 8/1971 | Petrie et al. | |
| 3,678,555 A | | 7/1972 | Hansen | |
| 4,422,648 A | | 12/1983 | Eaton et al. | |
| 4,483,659 A | | 11/1984 | Armstrong | |
| 5,743,713 A | | 4/1998 | Hattori et al. | |
| 2012/0282101 A1 | | 11/2012 | Malmborg et al. | |

* cited by examiner

*Primary Examiner* — Phutthiwat Wongwian
*Assistant Examiner* — William Breazeal
(74) *Attorney, Agent, or Firm* — Ernest G. Cusick; Frank A. Landgraff

(57) ABSTRACT

A compressor blade mounting arrangement includes a compressor blade having an airfoil, a base attachment and a platform disposed between the airfoil and the base attachment. The base attachment includes a first root portion extending radially inwardly from the platform and a second root portion extending radially inwardly from the platform, the first root portion and the second root portion defining a hollow portion therebetween. The base attachment also includes a compression plate disposed within the hollow portion and in fitted engagement with the first root portion and the second root portion. The base portion further includes at least one tab protruding from at least one of the first root portion and the second root portion. The compressor blade mounting arrangement also includes a wheel including a channel extending from a base wall to a rim of the wheel, the channel having a varying opening width.

17 Claims, 3 Drawing Sheets

COMPRESSOR BLADE MOUNTING ARRANGEMENT

BACKGROUND OF THE INVENTION

The subject matter disclosed herein relates to compressor blades, and more particularly to a mounting arrangement for such compressor blades.

With the ever present need for higher performance and efficiency for gas turbine engines, compressor exit temperatures have increased over time. Aft stages of a compressor may be highly stressed as a result of such thermal exposure. Compressor blade attachments in the aft stages are subjected to hot flowpath gases that may have adverse effects on durability. In particular, a reduced low cycle fatigue (LCF) life is observed in highly stressed loading slots located along a wheel of the compressor. The loading slots along the aft end of the compressor are often the life limiting location on the entire rotor. High stresses in the aft stages are a product of mechanical stress due to rotation and thermal stress due to temperature gradients. Several attempts to overcome the issues associated with the high stresses discussed above have focused on reducing mechanical stress, such as reducing or eliminating the loading slot or employing more expensive material. An option commonly used to reduce the thermal stress and temperature exposure is to cool the wheel rims with air from an external cooling air skid. These options can add significant cost and complexity to each engine.

BRIEF DESCRIPTION OF THE INVENTION

According to one aspect of the invention, a compressor blade mounting arrangement includes a compressor blade having an airfoil, a base attachment and a platform disposed between the airfoil and the base attachment. The base attachment includes a first root portion extending radially inwardly from the platform and a second root portion extending radially inwardly from the platform, the first root portion and the second root portion defining a hollow portion therebetween. The base attachment also includes a compression plate disposed within the hollow portion and in fitted engagement with the first root portion and the second root portion. The base portion further includes at least one tab protruding from at least one of the first root portion and the second root portion. The compressor blade mounting arrangement also includes a wheel including a channel extending from a base wall to a rim of the wheel, the channel having a varying opening width and configured to receive the tab therein.

According to another aspect of the invention, a compressor blade mounting arrangement includes a plurality of compressor blades, each of the plurality of compressor blades having an airfoil, a base attachment and a platform disposed between the airfoil and the base attachment. Also included is a wheel for mounting the plurality of compressor blades thereto, the wheel including a channel extending from a rim of the wheel, wherein the rim is disposed at a first radial location along a first portion of the wheel and at a second radial location along a second portion of the wheel, the second radial location located radially inwardly of the first radial location.

According to yet another aspect of the invention, a gas turbine engine includes a compressor, a combustion system and a turbine system. Also included is a plurality of compressor blades each having an airfoil, a base attachment and a platform disposed between the airfoil and the base attachment, wherein the base attachment includes a first root portion extending radially inwardly from the platform. The base attachment also includes a second root portion extending radially inwardly from the platform, the first root portion and the second root portion defining a hollow portion therebetween. The base attachment further includes a compression plate disposed within the hollow portion and in fitted engagement with the first root portion and the second root portion. The base attachment yet further includes a tab protruding from at least one of the first root portion and the second root portion. The gas turbine engine also includes a wheel for mounting the plurality of compressor blades thereto, the wheel including a channel extending from a rim of the wheel, wherein the rim is disposed at a first radial location along a first portion of the wheel and at a second radial location along a second portion of the wheel, the second radial location located radially inwardly of the first radial location.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

The terms "axial" and "axially" as used in this application refer to directions and orientations extending substantially parallel to a center longitudinal axis of a turbine system. The terms "radial" and "radially" as used in this application refer to directions and orientations extending substantially orthogonally to the center longitudinal axis of the turbine system. The terms "upstream" and "downstream" as used in this application refer to directions and orientations relative to an axial flow direction with respect to the center longitudinal axis of the turbine system.

Figure 1:
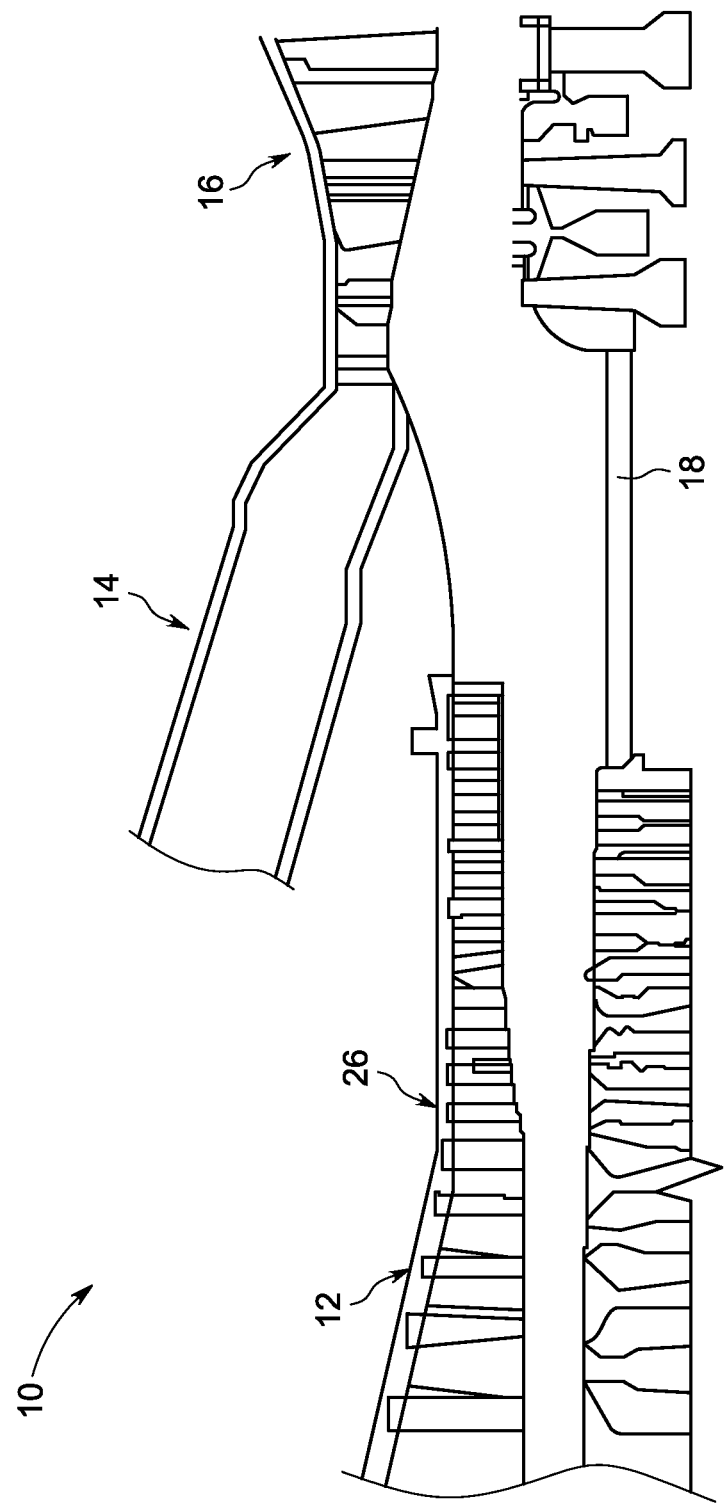
FIG. 1 is a schematic illustration of a gas turbine engine.

Referring to FIG. 1, a turbine system, such as a gas turbine engine, for example, is schematically illustrated with reference numeral 10. The gas turbine engine 10 includes a compressor section 12, a combustor section 14, a turbine section 16 and a shaft 18. It is to be appreciated that one embodiment of the gas turbine engine 10 may include a plurality of compressors 12, combustors 14, turbines 16 and/or shafts 18. The compressor section 12 and the turbine section 16 are coupled by the shaft 18 to form a rotor. The shaft 18 comprises a single shaft or a plurality of shaft segments coupled together.

The combustor section 14 uses a combustible liquid and/or gas fuel, such as natural gas or a hydrogen rich synthetic gas, to run the gas turbine engine 10. An air-fuel mixture is made in the combustor section 14, thereby causing a combustion that creates a hot pressurized exhaust gas. The combustor section 14 directs the hot pressurized gas through a transition piece into a turbine nozzle (or "stage one nozzle"), and other stages of buckets and nozzles causing rotation of turbine blades.

Figure 2:
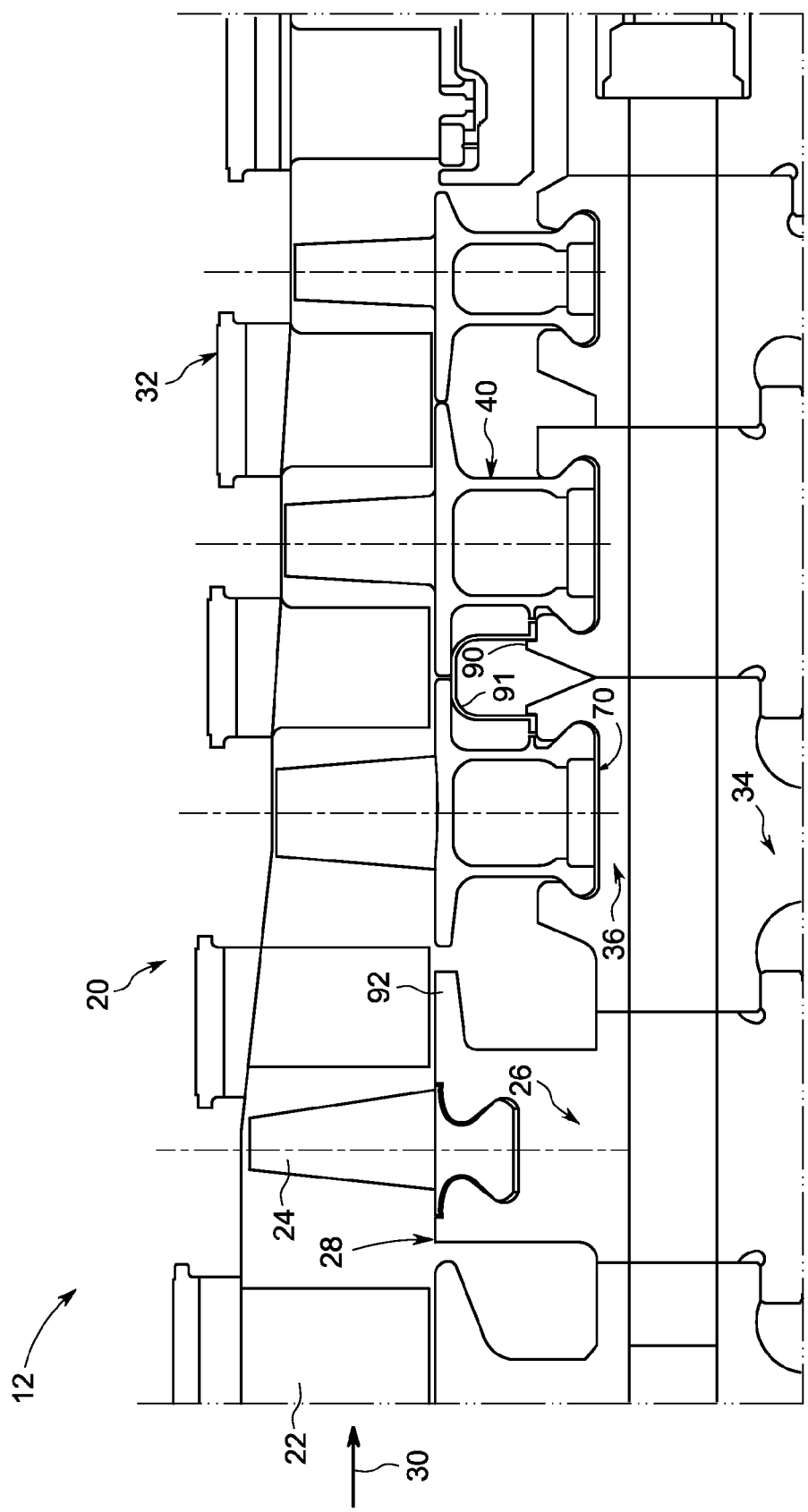
FIG. 2 is a schematic illustration of an aft portion of a compressor of the gas turbine engine.

Referring now to FIG. 2, a portion of the compressor section 12 is illustrated in greater detail. As illustrated, the compressor section 12 includes a plurality of compressor stages 20, with each stage comprising one or more circumferentially spaced stator vanes 22 aligned in a row at a similar axial location, along with an axially preceding or succeeding row of circumferentially spaced rotor blades 24 disposed at a similar axial location. The plurality of compressor stages 20 includes a middle stage 26 (FIG. 1) disposed at a relatively axial mid-point of the plurality of compressor stages 20. A plurality of forward stages 28 are positioned upstream of the middle stage 26, with respect to a direction of a main flow path 30 flowing through the compressor section 12. Additionally, a plurality of aft stages 32 are positioned downstream of the middle stage 26, also with respect to a direction of the main flow path 30. As will be appreciated from the description below, the embodiments described herein are typically employed in conjunction with one or more of the plurality of aft stages 32, but it is contemplated that all of the plurality of compressor stages may benefit from embodiments described herein.

Figure 3:
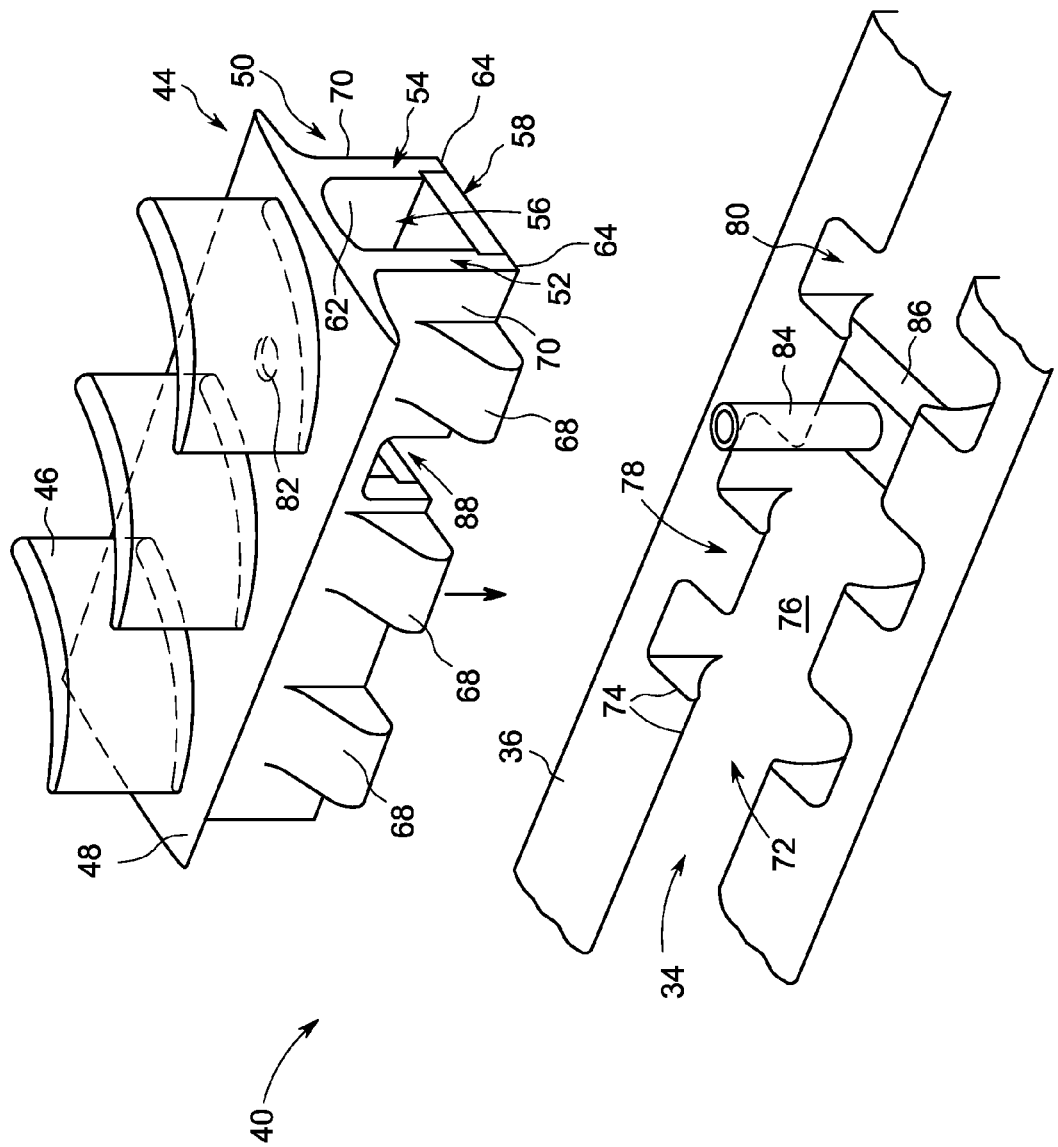
FIG. 3 is a perspective view of a compressor blade mounting arrangement.

Referring to FIG. 3, with continued reference to FIG. 2, at least one wheel 34 is mounted on, and forms, a portion of the rotor 18. The rotor 18, and more particularly the at least one wheel 34, includes a rim portion 36 disposed at a radially outward position of the at least one wheel 34. One or more of the circumferentially spaced rotor blades 24 is mounted to the at least one wheel 34 with a compressor blade mounting arrangement 40. The compressor blade mounting arrangement 40 includes a compressor blade set 44 and a portion of the at least one wheel 34, with each including features that facilitate mounting at a radial location disposed radially inwardly of the main flow path 30 to reduce thermal stresses imposed at the mounting location, as will be described in detail below.

The compressor blade set 44 includes an airfoil 46, a platform 48 and a base attachment 50. The features of the compressor blade set 44 are typically integrally formed with each other, but operatively coupling the features is contemplated. As shown, a plurality of airfoils may be coupled along the platform 48 as a single structure. The base attachment 50 includes a first root portion 52 and a second root portion 54, each extending radially inwardly from the platform 48 in a substantially parallel manner. The first root portion 52 and the second root portion 54 are spaced from each other to define a hollow portion 56 therebetween. To provide stiffening of the overall base attachment 50, a compression plate 58 is fittingly engaged within the hollow portion 56 and is in tight contact with respective inner surfaces 62 of the first root portion 52 and the second root portion 54. Various attachment methods may be employed for the compression plate 58, such as brazing, press fitting, or compression plate welding to the first root portion 52 and the second root portion 54. Alternatively, the compression plate 58 may be integrally formed with the first root portion 52 and the second root portion 54, such as through casting or electro-chemical machining (ECM), for example. The radial location of the compression plate 58 may vary. As shown, a single plate disposed proximate respective ends 64 of the first root portion 52 and the second root portion 54 may be employed, but certain embodiments include more than one plate at various radial locations. The above-described configuration provides a longer attachment structure than those typically observed in dovetail-shaped attachment structures, thereby allowing attachment of the compressor blade set 44 at a location removed from the main flow path 30. The hollow portion 56 of the base attachment 50 reduces the additional weight needed to lengthen the base attachment 50, with the compression plate 58 rigidifying the overall structure.

The base attachment 50 also includes at least one, but typically a plurality of tabs 68 protruding from an outer surface 70 of at least one of the first root portion 52 and the second root portion 54. In one embodiment, pairs of tabs are positioned along the outer surface 70 of the first root portion 52 and the second root portion 54. In the illustrated embodiment, three such pairs are included, with one side clearly shown. The at least one wheel 34 includes a channel 72 having a varying opening width 74 for receiving and retaining the plurality of tabs 68. The channel 72 extends from a base wall 76 radially outwardly to the rim portion 36. The varying opening width 74 comprises one or more tab retaining regions 78 and one or more tab receiving regions 80, with the tab receiving regions being wider than the tab retaining regions. In assembly, the compressor blade set 44 is placed in close proximity with the at least one wheel 34, such that the plurality of tabs 68 are aligned with the one or more tab receiving regions 80 and inserted therein. Upon insertion, the compressor blade set 44 is translated within the channel 72 to position the plurality of tabs 68 into alignment with the one or more tab retaining regions 78. In one embodiment, as shown in FIG. 3, the platform 48 includes a hole 82 that is aligned with a protrusion 84 extending from the channel 72 during assembly. The protrusion 84 is moveable within the channel 72 via a translatable locker 86 disposed therein. The protrusion 84 may be configured to receive a screw or other mechanical fastener that extends through the hole 82 of the platform 48 and into the protrusion 84, thereby mechanically fixing the compressor blade set 44 to the at least one wheel 34. In an embodiment, having the translatable locker 86, a locker recess 88 is formed within the first root portion 52 and the second root portion 54 to accommodate the translatable locker 86 upon insertion of the protrusion 84 into the hole 82 of the platform 48. In operation, when the plurality of tabs 68 is aligned with the one or more tab retaining regions 78 after installing and translating the compressor blade set 44, the translatable locker 86 will be in the locker recess 88 and in the one or more tab receiving regions 80 of the at least one wheel 34. The protrusion 84 is drawn up into the hole 82 by a set screw (not shown) or the like that is screwed down against the base wall 76 to push the translatable locker 86 out.

As shown in FIG. 2, some or all of the plurality of aft stages 32 include the base attachment 50 described above in detail. Specifically, the first root portion 52 and the second root portion 54 of the compressor blades extend radially inwardly to a greater extent than the radially innermost portion of the plurality of forward stages 28 of compressor blades. In particular, the rim portion 36 of the at least one wheel 34 is disposed at a first radial location 90 along a first portion of the at least one wheel 34, while the rim portion 36 is disposed at a second radial location 92 along a second portion of the at least one wheel 34, with the second radial location 92 being radially outward of the first radial location 90. Additionally, a flow path seal 91 may be included to reduce the ingress of hot gas into the wheel region and/or the loss of cooling flow into the hot gas path.

Advantageously, the attachment region of the compressor blades located proximate the aft portion of the compressor section 12 is substantially removed from the main flow path 30 of the compressor section 12, thereby reducing the temperature that the attachments are exposed to. The attachments are highly stressed regions and the temperature reduction during operation and cycling may substantially increase the durability of the attachment regions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A compressor blade mounting arrangement comprising:
a compressor blade having an airfoil, a base attachment and a platform disposed between the airfoil and the base attachment, wherein the base attachment comprises:
a first root portion extending radially inwardly from the platform;
a second root portion extending radially inwardly from the platform;
a compression plate disposed opposite the platform and in fitted engagement with the first root portion and the second root portion; and
a tab protruding from an outer surface of at least one of the first root portion and the second root portion; and
a wheel including a channel extending from a base wall to a rim of the wheel, the channel having a varying opening width and configured to receive the tab therein;
wherein the platform, the first root portion, the second root portion, and the compression plate define a cavity therein; and wherein the tab is thermally separated from the airfoil by the cavity.

2. The compressor blade mounting arrangement of claim 1, wherein the platform includes a hole configured to receive a protrusion operatively coupled to, and extending from, the channel of the wheel for aligning the compressor blade with the wheel.

3. The compressor blade mounting arrangement of claim 2, wherein the base attachment further comprises a locker recess on a radially inboard side of the platform and aligned with the hole of the platform, and wherein the protrusion is operatively coupled to a locker disposed in the channel and configured to slide within the channel.

4. The compressor blade mounting arrangement of claim 1, wherein the channel comprises a plurality of tab receiving regions for receiving a plurality of corresponding tabs of the base attachment.

5. The compressor blade mounting arrangement of claim 1, wherein the compressor blade mounting arrangement is disposed in a compressor of a gas turbine engine comprising a plurality of fore stages and a plurality of aft stages; and wherein the rim is disposed at a first radial location along the fore stages and at a second radial location along the aft stages, the second radial location being located radially inwardly of the first radial location; and wherein the compressor blade mounting arrangement is located at one of the plurality of aft stages of the gas turbine engine.

6. The compressor blade mounting arrangement of claim 1, further comprising a plurality of airfoils integrally formed with the platform.

7. The compressor blade mounting arrangement of claim 1, wherein the compression plate is brazed to the first root portion and the second root portion.

8. The compressor blade mounting arrangement of claim 1, wherein the compression plate is press fit to the first root portion and the second root portion.

9. The compressor blade mounting arrangement of claim 1, wherein the compression plate is compression plate welded to the first root portion and the second root portion.

10. The compressor blade mounting arrangement of claim 1, wherein the compression plate is integrally formed with the first root portion and the second root portion.

11. A compressor blade mounting arrangement comprising:
a plurality of compressor blades, each of the plurality of compressor blades having an airfoil, a base attachment and a platform disposed between the airfoil and the base attachment;
wherein the base attachment comprises:
a first root portion extending radially inwardly from the platform;
a second root portion extending radially inwardly from the platform:
a compression plate disposed opposite the platform and in fitted engagement with the first root portion and the second root portion; and
at least one tab protruding from an outer surface of at least one of the first root portion and the second root portion; and
a wheel for mounting the plurality of compressor blades thereto, the wheel including a channel extending from a base wall to a rim of the wheel, the channel having a varying opening width and configured to receive the tab therein;
wherein the platform, the first root portion, the second root portion, and the compression plate define a cavity therein; and
wherein the tab is thermally separated from the airfoil or each blade by the cavity.

12. The compressor blade mounting arrangement of claim 11, wherein the platform includes a hole configured to receive a protrusion operatively coupled to, and extending from, the channel of the wheel for aligning the plurality of compressor blades with the wheel.

13. The compressor blade mounting arrangement of claim 12, wherein the base attachment further comprises a locker recess on a radially inboard side of the platform and aligned with the hole of the platform, and wherein the protrusion is operatively coupled to a locker disposed in the channel and configured to slide within the channel.

14. The compressor blade mounting arrangement of claim 11, wherein the channel comprises a plurality of tab receiving regions for receiving a plurality of corresponding tabs of the base attachment.

15. The compressor blade mounting arrangement of claim 11, wherein the compressor blade mounting arrangement is disposed in a compressor of a gas turbine engine comprising a plurality of fore stages and a plurality of aft stages; and wherein the rim is disposed at a first radial location along the fore stages and at a second radial location along the aft stages, the second radial location being located radially inwardly of the first radial location; and wherein the compressor blade mounting arrangement is located at one of the plurality of aft stages of the gas turbine engine.

16. The compressor blade mounting arrangement of claim 11, further comprising a plurality of airfoils integrally formed with the platform.

17. A gas turbine engine comprising: a compressor; a combustion system; a turbine system;
a plurality of compressor blades each having an airfoil, a base attachment and a platform disposed between the airfoil and the base attachment, wherein the base attachment comprises:
a first root portion extending radially inwardly from the platform;
a second root portion extending radially inwardly from the
a compression plate disposed opposite the platform and in fitted engagement with the first root portion and the second root portion; and
a tab protruding from an outer surface of at least one of the first root portion and the second root portion; and a wheel for mounting the plurality of compressor blades thereto, the wheel including a channel extending from a rim of the wheel, the channel having a varying opening width and configured to receive the tab therein,
wherein the platform, the first root portion, the second root portion, and the compression plate define a cavity therein; and wherein the tab is thermally separated from the airfoil by the cavity.

\* \* \* \* \*